United States Patent Office 3,389,086
Patented June 18, 1968

3,389,086
PRODUCT OF REACTION OF AN EPOXY RESIN WITH AN HYDROLYZED POLYOLEFIN-P₂S₅ AMINE REACTION PRODUCT AND LUBRICATING OIL CONTAINING SAME
David D. Reed, Lagrangeville, and Eugene Moroz, New York, N.Y., and James M. Petersen, Erie, Pa., assignors to Texaco Inc., New York, N.Y., a corporation of Delaware
No Drawing. Filed June 1, 1966, Ser. No. 554,315
10 Claims. (Cl. 252—46.7)

II. 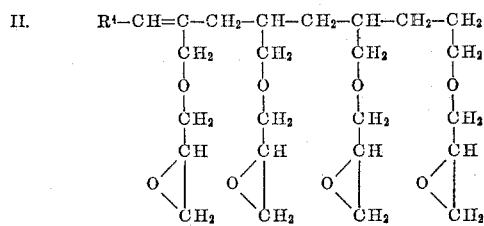

III. 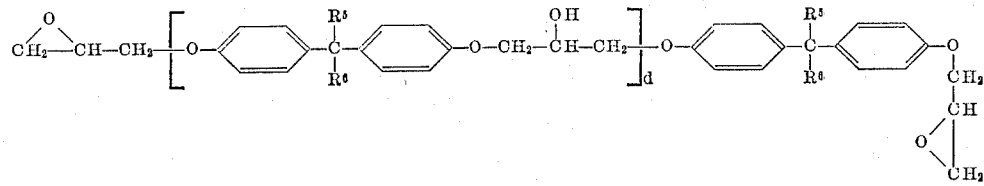

ABSTRACT OF THE DISCLOSURE

An epoxy resin derivative suitable as a detergent dispersant in lube oils and lube oil compositions thereof prepared by contacting epoxy resin sequentially with a steam hydrolyzed, inorganic phosphorus acid-free, polyolefin-P₂S₅ acid product and then an amine of less than 30 carbon atoms.

This invention relates to epoxy resin derivatives and their method of preparation. More particularly, it is directed to the reaction products of resins containing epoxy groups and hydrolyzed, inorganic phosphorus acid free polyolefin-P₂S₅ acid products and is further directed to amine derivatives of said reaction products. It also pertains to the method of manufacture of said reaction products and amine derivatives.

The epoxy resin derivatives formed by the method of the invention are useful as detergent dispersants in lubricating oils. They are advantageously utilized in finished lubricants in concentrations between about 0.2 and 10 wt. percent. Lubricating bases employed can be hydrocarbon mineral oils, e.g., those having an SUS viscosity at 100° F. between about 50 and 100 but usually falling in the SUS viscosity range of between about 70 and 300 at 100° F. Other lubricating bases may be the synthetic ester lubricating oils such as the high boiling aliphatic dicarboxylic esters of monohydric alcohols such as di-2-ethylhexyl sebacate and polyesters described in U.S. 2,628,974. Still other contemplated lubricant bases are the synthetic ether oils such as the liquid polyphenyl ethers.

METHOD OF PREPARING EPOXY RESIN DERIVATIVES

Broadly, the epoxy resin derivatives are prepared by contacting an epoxy resin selected from the group consisting of I. 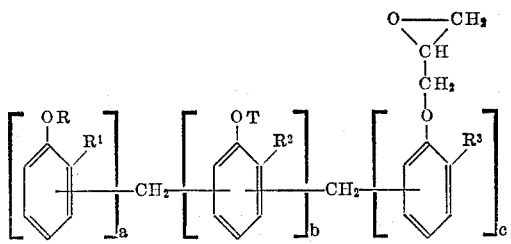

where "$a$" is an average integer between about 0.1 and 5.0, "$b$" is an average integer between about 0.1 and 5.0, "$c$" is an average integer between about 0.1 and 5.0, "$d$" is an average integer between 0 and 5, R represents a mixture of chlorohydrins, glycols and polymeric ethers with

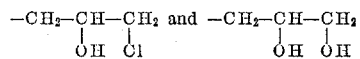

predominating, $R^1$ and $R^6$ are hydrogen or alkyl from 1 to 10 carbons and T is hydrogen or

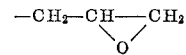

with a first member selected from the group consisting of a steam hydrolyzed, inorganic phosphorus acid free, polyolefin-P₂S₅ acid product and a first mixture of said acid product and an amine of less than 30 carbons selected from the group consisting of $R^7$—NH(̵$R^8$NH)̵$_x$$R^9$—NH₂ and Y—$R^{10}$—NH₂ where $R^7$ is hydrogen, alkyl or alkenyl, $R^8$, $R^9$ and $R^{10}$ are alkylene, "$x$" is an integer from 0 to 10 and Y is

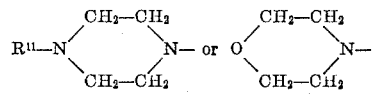

where $R^{11}$ is hydrogen or alkyl. It is to be noted the definition of R in respect to Formula I above denotes that Formula I represents a mixture of compounds.

The reaction between the epoxy resin and the P₂S₅ acid reaction product or the combination of the P₂S₅ acid product and amine is advantageously conducted at a temperature between about 25° and 200° C., preferably between about 75 and 125° C., desirably for a period of between about 0.5 and 3.0 hours. Under advantageous conditions the ratio of epoxide equivalents of epoxy resin reactant to moles of P₂S₅ acid product is between about 1.0:0.9 and 1.0:0.1, preferably between about 1.0:0.4 and 1.0:0.6. When said combination is employed as the reactant the ratio between moles of P₂S₅ acid product and amine equivalents is desirably between about 1.0:0.1 and 1.0:0.9, preferably between about 1.0:0.6 and 0.1:0.4. By the term "epoxide equivalents" it is meant the number of epoxide equivalent weights of the epoxy resin reactant. The epoxide equivalent weight is the molecular weight of the epoxy resin reactant divided by the number of epoxy groups in each molecule. The term "amine equivalents" means the number of amine equivalent weights. The amine equivalent weight is determined by dividing the molecular weight of the amine reactant by the number of primary and secondary amine groups in each molecule.

Advantageously, the reaction is conducted in an inert liquid medium, preferably a medium which is a solvent for all the reactants.

In addition to the foregoing, when the amine is included as a reactant, it is desirable to sequentially introduce the reactants into the reaction system, preferably first reacting the $P_2S_5$ acid reactant with the epoxy resin followed by the reaction of the resultant product with the amine. Still further, it is preferable to conduct the reaction under essentially anhydrous conditions to effect homogeneity of reaction products.

In the foregoing procedure, the reaction between the epoxy resin and $P_2S_5$ acid product is theorized to be an addition reaction taking place at the epoxy group fragment with the amine, if used, modifying the acidic fragment groups.

The resultant epoxy resin derivative derived from the aforedescribed procedure can be purified by standard means, e.g., fractional distillation under reduced pressure or selective solvent extraction.

REACTION INGREDIENTS

$P_2S_5$ acid reactant

The hydrolyzed, inorganic phosphorus acid free, polyolefin-$P_2S_5$ acid reactant is prepared from a polyolefin-$P_2S_5$ precursor. The precursor is formed by reacting a polyolefinic hydrocarbon with $P_2S_5$ (the $P_2S_5$ constituting between about 5 and 40 wt. percent of the reaction mixture) at a temperature between about 100 and 320° C. in the presence of between about 1 and 5 wt. percent sulfur. Under preferred conditions, the resultant polyolefin-$P_2S_5$ precursor reaction mixture is normally diluted with mineral oil of a viscosity between about 50 and 1000 SUS at 100° F., preferably between about 70 and 300. Lubricating oil normally constitutes between about 25 and 75 wt. percent of the reaction mass. The purpose of the mineral oil dilution at this point is to liquefy the polyolefin-$P_2S_5$ precursor product in order to facilitate its subsequent treatment and reaction. This dilution, however, is an optional procedure and if employed the mineral oil remains entirely through the method of the invention, and therefore, forms a lubricating oil concentrate of the epoxy resin derivatives contemplated herein.

The precursor product or mineral oil concentrate thereof is then contacted with steam, preferably by bubbling therethrough at a temperature between about 100 and 260° C. to form a mixture of steam hydrolyzed polyolefin-$P_2S_5$ reaction product and inorganic phosphorus acid. Under the preferred conditions, the unreacted water is continually drawn off as vapor. Advantageously, during the steam hydrolysis at least about 1 mole of steam is employed per mole of polyolefin-$P_2S_5$ reaction product. Steam hydrolysis is normally conducted for a period of about 1 to 20 hours and more.

The inorganic phosphorus acids formed during the steam hydrolysis are then removed. A number of different procedures are available for removal, for example, in U.S. Patent Nos. 2,987,512 and 2,951,835, removal of inorganic phosphorus acid is effected by contact with synthetic hydrous alkali metal silicate. In U.S. 3,135,729 a particularly desirable process for removal of the inorganic phosphorus acids from the hydrolyzed polyolefin-$P_2S_5$ product via extraction with anhydrous methanol is described. Broadly, in this extraction step, inorganic phosphorus acid removal comprises first drying the mineral oil solution of the hydrolyzed polyolefin-$P_2S_5$ product, e.g., by maintaining temperature of the solution above the boiling point of water, e.g., between 120 and 200° C. and passing an inert gas such as nitrogen therethrough. The dry concentrate is then contacted under mixing conditions with about 0.5 to 3 volumes of anhydrous methanol per volume of said concentrate at a temperature between about 40 and 80° C. forming an extract phase containing inorganic phosphorus acid and the mineral oil raffinate phase containing the inorganic phosphorus acid free steam hydrolyzed $P_2S_5$-polyolefin reaction product. During the extraction procedure, superatmospheric pressure may be employed, e.g., up to 50 p.s.i.g. to maintain the methanol in the liquid state. At the end of the extraction step any methanol carried over into the raffinate phase is preferably removed, e.g., by standard procedure such as tripping the raffinate with an inert gas at elevated temperature.

In the foregoing procedure for preparing the $P_2S_5$ acid reaction product, the steam hydrolysis of the resultant product is preferably conducted in the presence of an inert atmosphere such as nitrogen, helium or argon.

Examples of the polyolefin precursor reactants contemplated herein are the aliphatic monoolefinic polymers of a molecular weight between about 250 and 50,000 such as polyethylene (500 m.w.), polyisobutene (1100 m.w.), polybutene (2000 m.w.), polypropylene (3000 m.w.), polyisopropylene (5000 m.w.), monoolefinic copolymers such as the propylene-isobutene (3500 m.w.) copolymer. A particularly preferred polymer is polyisobutene having an average molecular weight between about 600 and 5000. Copolymers of conjugated dienes and monoolefins such as the copolymer of butadiene and isobutenes having an average molecular weight in the prescribed range are also contemplated.

Epoxy resin reactant

Referring to the general epoxy resin formulas designated as I, II and III as heretofore set forth, the following specific epoxy resins are contemplated:

A mixture of epoxy resin compounds of the I formula where $R^1$, $R^2$ and $R^3$ are methyl, T is

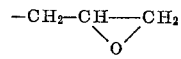

$a=1.2$, $b=1.6$, $c=1$, of an average molecular weight of 1080 and an epoxide equivalent wt. of 225. A mixture of epoxy resin compounds of the I formula where $R^1$, $R^2$ and $R^3$ are methyl, T is hydrogen, $a=0.7$, $b=1.9$, $c=2.7$, an average molecular weight of 855 and an epoxide equivalent wt. of 310. These mixtures are further described in the Koppers Co. Inc. publication T–208–3M762 entitled "Kopox Epoxy Resins" under the respective designations Kopox 737A and Kopox 955.

An epoxy resin of the II formula where $R^4$ is hydrogen, an average molecular weight of 520 and an epoxide equivalent weight of 130.

An epoxy of the III formula where $R^5$ and $R^6$ are methyl, $d$ is 0 and the epoxide equivalent weight of about 150.

Amine reactant

Specific examples of the amines contemplated herein are N-(2-aminoethyl)-piperazine, N-(2-aminoethyl)-morpholine, N-tallow trimethylenediamine, tetraethylenepentamine, N-hexylamine and 3-methylaminopropylene, ethylene diamine, and ethylamine.

Inert reaction solvents

Examples of the reaction solvents contemplated herein are the liquid aromatic hydrocarbon such as toluene, xylene, benzene and ethylbenzene.

The following examples further illustrate the method of the invention but are not to be construed as limitations thereof.

EXAMPLE I

This example illustrates the preparation of the hydrolyzed inorganic phosphorus acid free polyalkene-$P_2S_5$ reactant.

A polyisobutene (1100 m.w.)-$P_2S_5$ reactant is prepared by contacting with agitation at about 232° C. 15,100 lbs. of polyisobutene of an average molecular weight of about 1100 with 4000 lbs. of $P_2S_5$ in the presence of sulfur. The reaction is continued under agitation conditions of 6 hours until the reaction mixture is soluble in n-pentane. The reaction product is then diluted with 23,450 lbs. of naphthene base petroleum oils having an SUS viscosity at 100° F. of about 100. The stem is then bubbled through the formed polyisobutene-P₂S₅ reaction product containing lube oil concentrate at about 180° C. for 10 hours utilizing a steam rate of 487 lbs./hour. The resultant steam hydrolyzed concentrate is dried by passage of nitrogen therethrough. The steam hydrolyzed lube oil concentrate is extracted with about 50% by volume of methanol at 66° C. to give a methanol extraction containing inorganic phosphorus acid free, steam hydrolyzed polyisobutene (1100 m.w.)-P₂S₅ reactant. The lube oil raffinate is separated from the methanol extract phase and blown with nitrogen at about 122° C. to remove any residual methanol leaving a lube oil solution containing steam hydrolyzed, inorganic phosphorus acid free polyisobutene (1100 m.w.)-P₂S₅ acid product.

EXAMPLE II

This example illustrates the method of the invention.

In the following runs the particular epoxy resin reactant employed was first dissolved in toluene and heated with stirring in a nitrogen atmosphere to 100° C. The steam hydrolyzed, inorganic phosphorus acid free, polyisobutene (1100 m.w.)-P₂S₅ acid product of the type prepared in Example I having the following analysis: specific gravity=0.9037; wt. percent phosphorus=1; wt. percent sulfur=0.57 and Neut. No.=20.8, was combined with a minimum of toluene to render it fluid and added dropwise to the stirred epoxy resin reactant. When the addition was complete, the reaction mixture was heated at 100° C. for 2 hours to cool and stripped free of toluene. In those runs where amine was used the following modification was carried out. After the addition of the hydrolyzed polyolefin-P₂S₅ reactant, the stirred reaction mixture was heated at 100° C. for 15 minutes whereupon the amine was added dropwise at 100° C. utilizing toluene when necessary to fluidize the amine and heating was continued for 2 additional hours after the adidtion. Irrespective of procedure, the reaction was then cooled and stripped free of solvent leaving the epoxy resin derivative product.

A description of the runs utilizing the foregoing procedure and the epoxy resin derivative product resulting therefrom are found in the following tables:

TABLE I.—REACTION INGREDIENTS AND AMOUNTS

| Run | Epoxy Resin | G. | P₂S₅ Reaction Product, g. | Amine | G. | Toluene, mls. |
|---|---|---|---|---|---|---|
| A | I¹ | 31 | 338 | | | 700 |
| B | I¹ | 28 | 169 | N-(2-aminoethyl)-piperazine | 17 | 600 |
| C | I¹ | 29 | 251 | N-(2-aminoethyl) morpholine | 4.5 | 600 |
| D | I¹ | 28 | 169 | N-(2-aminoethyl) morpholine | 15 | 600 |
| E | I¹ | 28 | 169 | N-tallow trimethylene diamine | 23 | 600 |
| F | I¹ | 28 | 169 | Tetraethylene pentamine | 12 | 600 |
| G | I² | 41 | 338 | | | 600 |
| H | II (R⁴=H) | 19 | 338 | | | 500 |
| I | II (R⁴=H) | 19 | 169 | N-(2-aminoethyl) piperazine | 8 | 400 |
| J | III (d=0, R⁵ and R⁶=CH₃) | 19 | 338 | | | 500 |
| K | III (d=0, R⁵ and R⁶=CH₃) | 19 | 169 | N-(2-aminoethyl) piperazine | 8 | 500 |

TABLE II.—EPOXY RESIN DERIVATIVE PRODUCT ANALYSIS

| Run | Wt. percent P | | Wt. percent N | | OH NO | | Neut. No. |
|---|---|---|---|---|---|---|---|
| | Calc. | Found | Calc. | Found | Calc. | Found | |
| A | 1 | 0.98 | | | 33 | 19 | 1.6 |
| B | 1 | 0.84 | 1.3 | 2.2 | 34 | 79 | 7.7 |
| C | 1 | 0.90 | 0.3 | .55 | 24 | 31 | ¹1.5 |
| D | 0.95 | 0.80 | .85 | 1.3 | 34 | 55 | 2.4 |
| E | 0.80 | 0.90 | 0.8 | 0.79 | 32 | 71 | 5.5 |
| F | 0.93 | 0.81 | 2.1 | 1.6 | 33 | 104 | 0.8 |
| G | 1 | 0.92 | | | 19 | 30 | 0 |
| H | 1.1 | 1.0 | | | 20 | 26 | 3.5 |
| I | 1 | 0.89 | 1.3 | 1.35 | 36 | 55 | 2.54 |
| J | 1.1 | 1 | | | 20 | 24 | 0 |
| K | 1 | 0 9 | 1.3 | 1.2 | 36 | 57 | 5.86 |

¹ Basic.

We claim:
1. An epoxy resin derivative product prepared by the method comprising contacting an epoxy resin selected from the group consisting of:

(A)

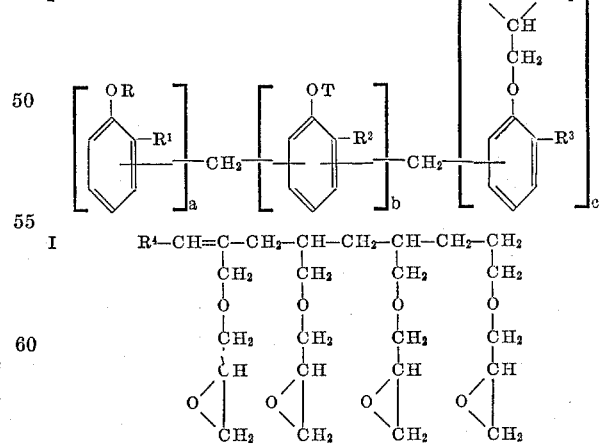

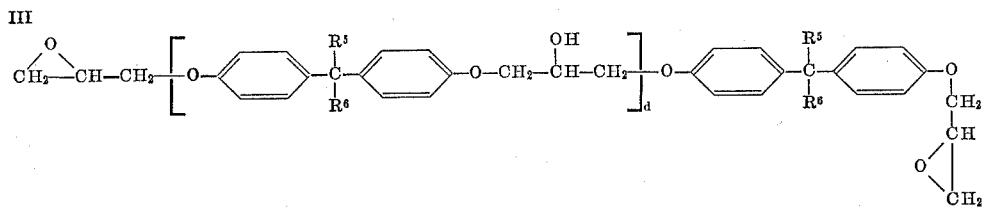

where "a" is an average integer between about 0.1 and 5.0, "b" is an average integer between about 0.1 and 5.0, "c" is an average integer between about 0.1 and 5.0, "d" is an average integer between about 0 and 5, R is a mixture of chlorohydrins, glycols and polymeric ethers with

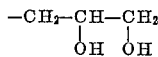

and

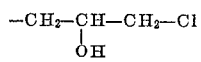

predominating in said mixture, $R^1$–$R^6$ are hydrogen or alkyl from 1 to 10 carbons and T is hydrogen or

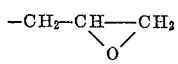

sequentially with a steam hydrolyzed, inorganic phosphorus acid free, polyolefin-$P_2S_5$ acid product and then an amine of less than 30 carbons selected from the group consisting of $R^7$—NH$+R^8$NH$)_xR^9$—NH$_2$ and Y—$R^{10}$—NH$_2$ where $R^7$ is hydrogen, alkyl or alkenyl, $R^8$, $R^9$ and $R^{10}$ are alkylene, $x$ is an integer from 0 to 10 and Y is

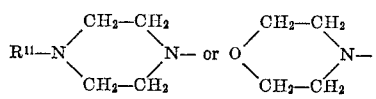

where $R^{11}$ is hydrogen or alkyl,
(B) said contacting conducted at a temperature between about 25 and 200° C. in a ratio of epoxide equivalents of said epoxy resin to moles of said acid product of between about 1.0:0.9 and 1.0:0.1, the ratio of moles of said $P_2S_5$ acid product to equivalents of said amine being between about 1.0:0.1 and 1.0:0.9,
(C) said steam hydrolyzed, inorganic phosphorus acid free polyolefin-$P_2S_5$ acid product formed by contacting $P_2S_5$ with an aliphatic polyolefin of an average molecular weight between about 250 and 50,000 in the presence of about 0.1 and 5 wt. percent sulfur at a temperature between about 100 and 320° C., said $P_2S_5$ comprising between about 5 and 40 wt. percent of the reaction mixture, to form a polyolefin-$P_2S_5$ first reaction product, contacting said polyolefin-$P_2S_5$ first reaction product with steam in a mole ratio of steam to said first reaction product of at least about 1:1 at a temperature between about 100 and 20° C. to form a hydrolyzed, inorganic phosphorus acid containing polyolefin-$P_2S_5$ second reaction product, separating said inorganic phosphorus acid from said second reaction product to form said steam hydrolyzed, inorganic phosphorus acid free polyolefin-$P_2S_5$ acid product.

2. A derivative product in accordance with claim 1 wherein said contacting in said A step is conducted in the presence of an inert gas atmosphere and in the presence of between about 25 and 80 wt. percent of an inert volatile liquid medium based on the reaction mixture and subsequent to said contacting said inert volatile liquid medium is removed to leave said epoxy resin derivative, and wherein in said C step the polyolefin-$P_2S_5$ reaction product prior to contacting with steam is diluted with a mineral oil of a SUS viscosity at 100° F. between about 70 and 300 to form a diluted polyolefin-$P_2S_5$ reaction mixture having a mineral lubricating oil content between about 25 and 75 wt. percent and wherein the reaction in the initial polyolefin-$P_2S_5$ contact is conducted in an inert gas atmosphere.

3. A derivative product in accordance with claim 2 wherein said epoxy resin is said I where $R^1$, $R^2$ and $R^3$ are methyl, T is

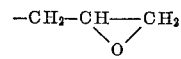

$a=1.2$, $b=1.6$ and $c=1$, said amine is N-(2-aminomethyl) piperazine, said liquid medium is toluene, and said polyolefin is polyisobutene of a molecular weight of 1100.

4. A derivative product in accordance with claim 2, wherein said epoxy resin is said I where $R^1$, $R^2$ and $R^3$ are methyl, T is

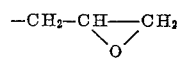

$a=1.2$, $b=1.6$ and $c=1$, said polyolefin is polyisobutene of a molecular weight of 1100 m.w., said amine is N-(2-aminoethyl) morpholine and said liquid medium is toluene.

5. A derivative product in accordance with claim 2, wherein said epoxy resin is said I where $R^1$, $R^2$ and $R^3$ are methyl, T is

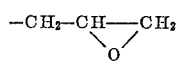

$a=1.2$, $b=1.6$ and $c=1$, said polyolefin is polyisobutene of a molecular weight of about 1100 m.w., said amine is N-tallow trimethylenediamine, and said liquid medium is toluene.

6. A derivative product in accordance with claim 2, wherein said epoxy resin is said I where $R^1$, $R^2$ and $R^3$ are methyl, T is

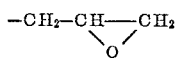

$a=1.2$, $b=1.6$ and $c=1$, said polyolefin is polyisobutene of a molecular weight of 1100, said amine is tetraethylenepentamine and said liquid medium is toluene.

7. A derivative product in accordance with claim 2, wherein said epoxy resin is II, where $R^4$ is hydrogen, said polyolefin is polyisobutene of a molecular weight of 1100, said amine is N-(2-aminoethyl) piperazine and said liquid medium is toluene.

8. A derivative product in accordance with claim 2 wherein said epoxy resin is said I where $R^1$, $R^2$ and $R^3$ are methyl, T is

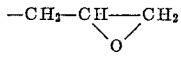

$a=0.7$, $b=1.9$ and $c=2.7$, said polyolefin is polyisobutene of a molecular weight of 1100 and said liquid medium is toluene.

9. A derivative product in accordance with claim 2 wherein said epoxy resin is said III, where $d=0$ and $R^5$ and $R^6$ are methyl, said polyolefin is polyisobutene of a molecular weight of 1100, said amine is N-(2-aminoethyl) piperazine and said liquid medium is toluene.

10. A derivative product in accordance with claim 2 wherein said epoxy resin is said II where $R^4$ is hydrogen, said polyolefin is said polyisobutene of a molecular weight of 1100 m.w., said amine is said N-(2-aminoethyl) piperazine and said liquid medium is toluene.

References Cited

UNITED STATES PATENTS

| | | | |
|---|---|---|---|
| 2,951,835 | 9/1960 | Kluge et al. | 260—139 |
| 2,987,512 | 6/1961 | Wisner et al. | 260—139 |
| 3,135,729 | 6/1964 | Kluge et al. | 260—139 |

FOREIGN PATENTS

| | | |
|---|---|---|
| 523,795 | 4/1956 | Canada. |
| 959,327 | 5/1964 | Great Britain. |

DANIEL E. WYMAN, *Primary Examiner.*

W. H. CANNON, *Assistant Examiner.*

UNITED STATES PATENT OFFICE
CERTIFICATE OF CORRECTION

Patent No. 3,389,086                          June 18, 1968

David D. Reed et al.

It is certified that error appears in the above identified patent and that said Letters Patent are hereby corrected as shown below:

Column 2, line 32, "$R^1$ and $R^6$" should read -- $R^1$ to $R^6$ --. Column 4, line 8, "tripping" should read -- stripping --. Column 5, line 61, "adidtion" should read -- addition --. Columns 5 and 6, TABLE I, in Runs A, B, C, D, E and F, in the second column headed by "Epoxy Resin" insert -- (a=1.2, b=1.6, c=1, $R^1$, $R^2$ and $R^3$=$CH_3$, T=-$CH_2$-CH$\underset{O}{\diagdown\diagup}$$CH_2$) --; same TABLE I, Run G, in the second column, insert -- (a=0.7, b=1.9, c=2.7; $R^1$, $R^2$, and $R^3$=$CH_3$; T=H) --. Column 6, TABLE II, third column, line 1 thereof, "0.98" should read -- 0.89 --; same table, third column, line 11 thereof, "09" should read -- 0.9 --; line 56, "I" should read -- II --.

Signed and sealed this 25th day of November 1969.

(SEAL)

Attest:

Edward M. Fletcher, Jr.

Attesting Officer

WILLIAM E. SCHUYLER, JR.

Commissioner of Patents